Feb. 22, 1966  G. R. ANDERSON ET AL  3,236,357
FRUIT ORIENTING APPARATUS
Filed July 2, 1962  3 Sheets-Sheet 1
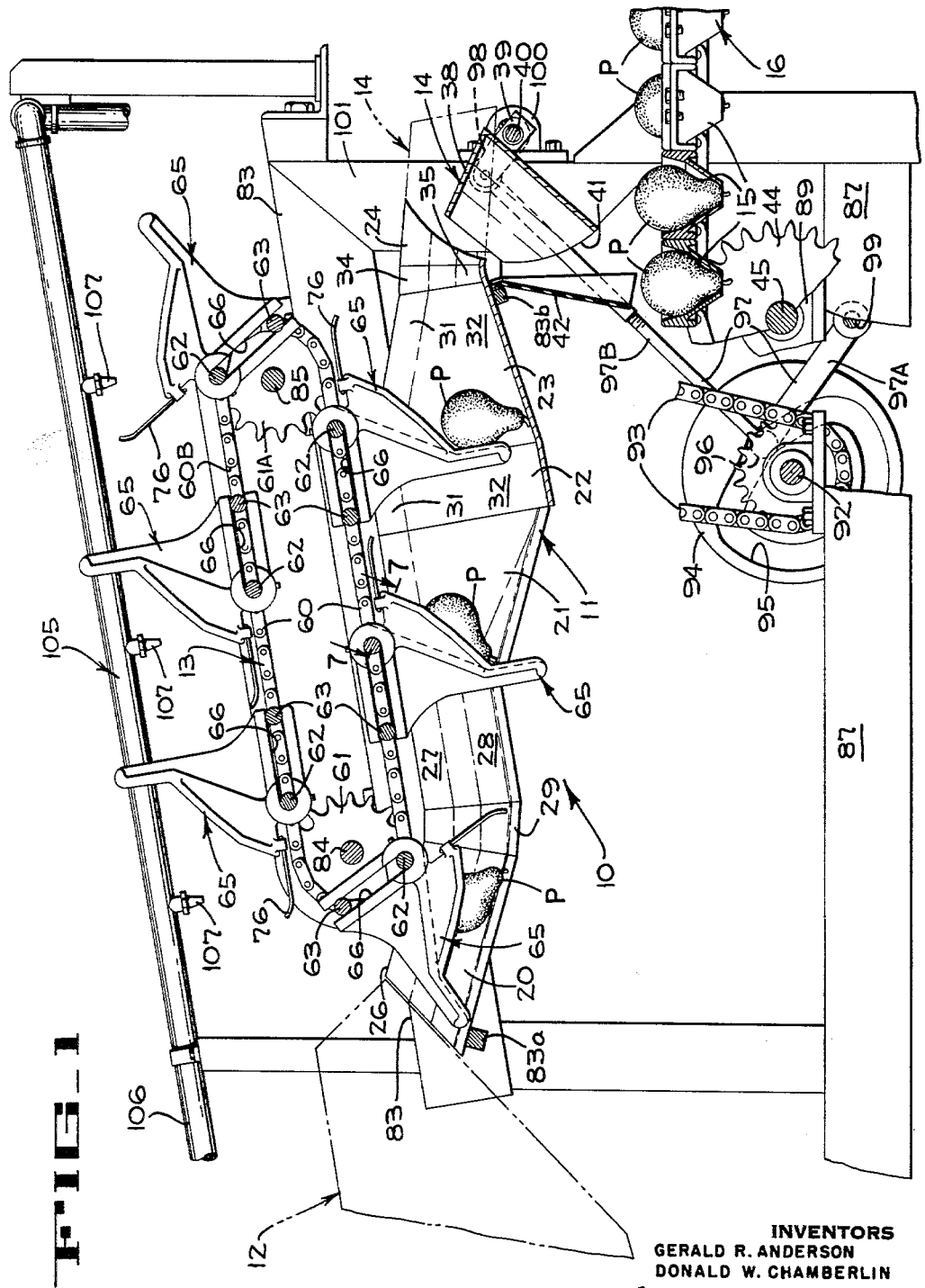
FIG_1
INVENTORS
GERALD R. ANDERSON
DONALD W. CHAMBERLIN
BY Hans G. Hoffmeister
ATTORNEY Feb. 22, 1966  G. R. ANDERSON ET AL  3,236,357
FRUIT ORIENTING APPARATUS
Filed July 2, 1962  3 Sheets-Sheet 2
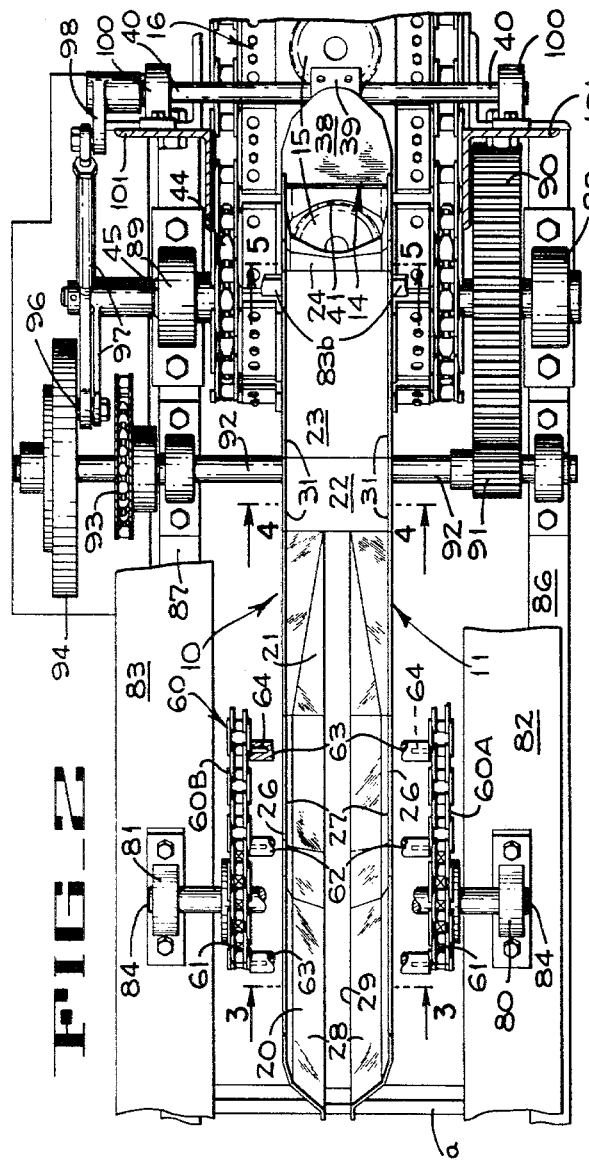
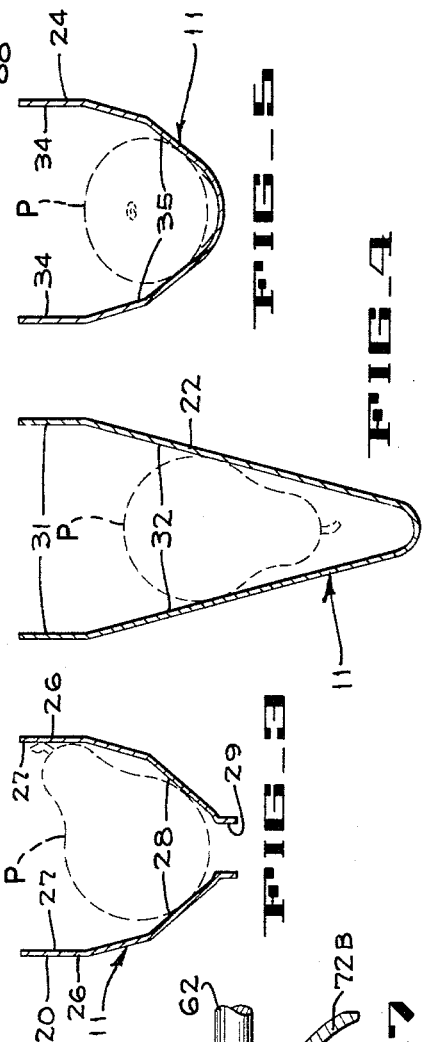
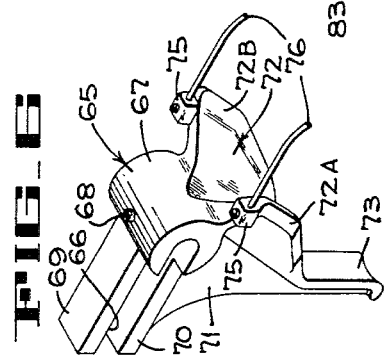
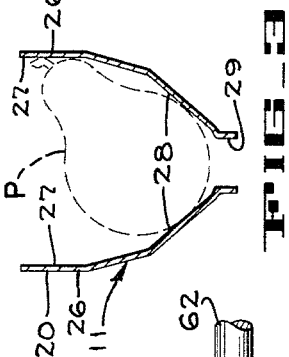
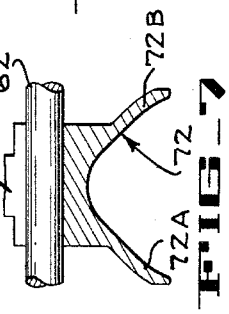
INVENTORS
GERALD R. ANDERSON
DONALD W. CHAMBERLIN
BY Hans G. Hoffmeister
ATTORNEY

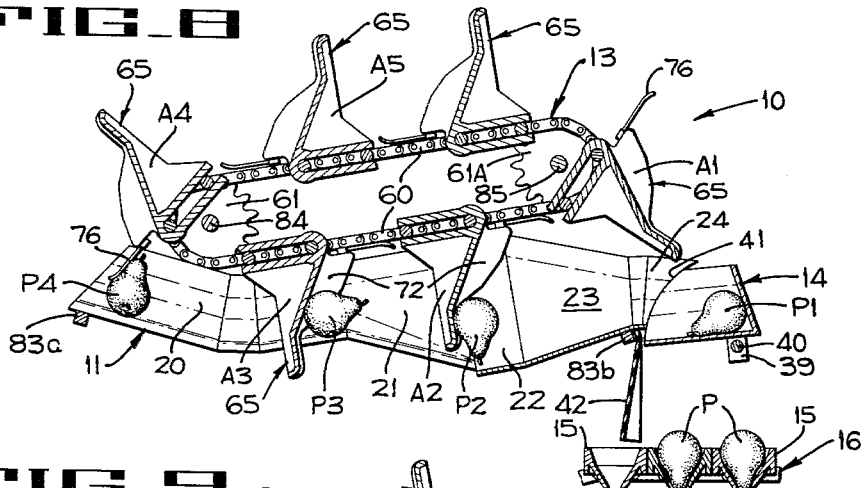
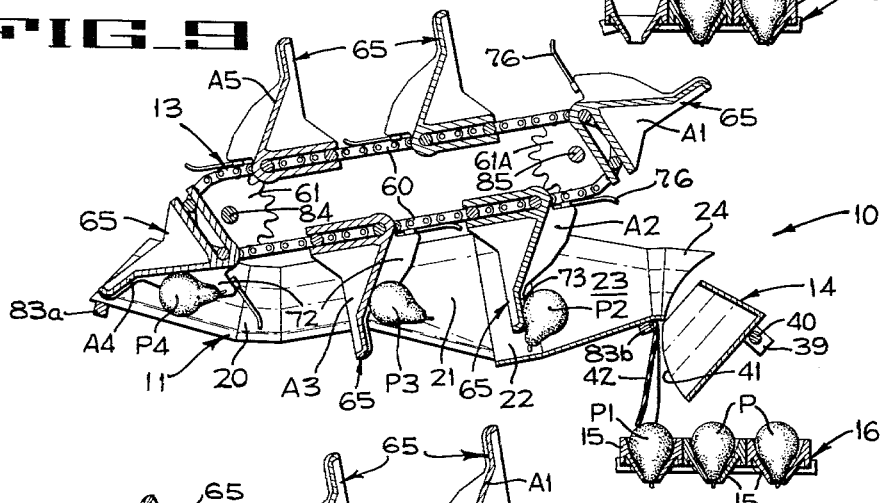
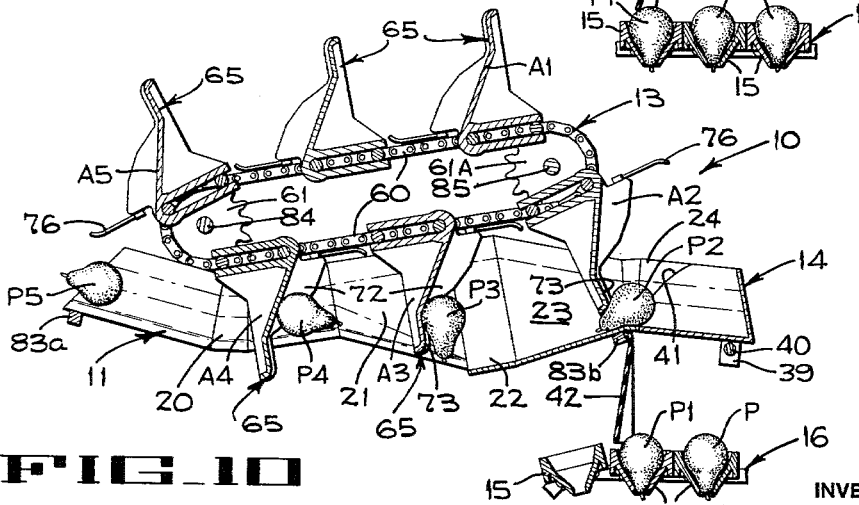

United States Patent Office 3,236,357
Patented Feb. 22, 1966

3,236,357
FRUIT ORIENTING APPARATUS
Gerald R. Anderson, Campbell, and Donald W. Chamberlin, Los Gatos, Calif., assignors to FMC Corporation, San Jose, Calif., a corporation of Delaware
Filed July 2, 1962, Ser. No. 206,787
18 Claims. (Cl. 198—33)

The present invention pertains to apparatus for orienting fruit and more particularly to a device for automatically orienting fruit such as pears, which are unsymmetrical about a transverse plane through their largest transverse diameter, so that such fruit may be properly fed to coring or slicing devices or other mechanisms in a continuous fruit processing line.

Certain types of fruit such as pears have long presented a problem to the canning industry due to the fact that the part of the fruit on one side of a transverse plane through their largest transverse diameter is not symmetrical with the part on the other side of the plane, i.e., where the volume or weight of the fruit is unevenly distributed along the longitudinal or stem-blossom axis. In order that the various operations in the canning process, such as coring, slicing, trimming, or the like may be carried out upon such fruit, each individual fruit has to be aligned with its larger end properly positioned with respect to mechanisms performing specific operations upon the fruit, such as automatic coring and stemming apparatus, so that a relatively large portion of the fruit will not be wasted.

For many years such aligning or orienting of the fruit was done by hand, as mechanisms which could automatically perform such a function were either too expensive or not efficient enough to make them economically practicable. Devices which were tested in the industry were found to frequently fail to function correctly. This was primarily due to the fact that the fruit, in general, was not uniform in size and configuration since a single box of a fruit, such as pears, may contain a wide variety of different shapes, sizes and weights. In the aligning of pears, for example, the generally "snubnosed" pear which is almost oval, and the typically "pear-shaped" pear with a long narrow end have presented basically different problems in the attempts to align such diverse forms of a single variety of fruit with the result that one or the other or both of these extreme shapes would fail to be properly oriented by the prior art structures. This non-uniformity characteristic, which is present in greater or lesser degree in all fruits, has therefore considerably increased the problems involved in providing a simple mechanism to properly align each individual article of fruit as it is passed through the processing line.

It is, therefore, an object of the present invention to provide a mechanism adapted to receive various sized and shaped, randomly arranged fruit of a type which is unsymmetrical about its largest transverse diameter and which will serve to properly orient such fruit in uniform aligned positions for a further processing operation.

Another object of this invention is to provide an improved fruit orienting device.

Another object of the present invention is to provide a mechanism which will receive regularly spaced fruit in timed relation and which will maintain such spacing while properly orienting the fruit into similar positions for delivery to a removal conveyor.

Another object is to provide a mechanism which will receive a randomly arranged fruit and which will automatically orient the fruit by delivering it to a moving cup on a conveyor with its stem end first.

Another object of this invention is to provide an apparatus for pushing a continuous series of spaced fruit through a fixed angular trough so as to assist in achieving the proper alignment for each fruit.

Another object is to provide an inverting mechanism which will continuously receive fruit from an aligning device and which will operate to invert and positively place each individual fruit in the proper position on a continuously moving conveyor.

Other objects and advantages of the invention will become apparent from the following description and the accompanying drawings in which:

FIGURE 1 is a vertical, longitudinal, central section through a fruit orienting apparatus embodying the present invention with parts being broken away for the purpose of illustration.

FIGURE 2 is a plan view of a portion of the apparatus of FIGURE 1 with parts broken away to disclose a drive mechanism.

FIGURE 3 is an enlarged fragmental section taken along the lines 3—3 of FIGURE 2.

FIGURE 4 is an enlarged fragmental section taken along the lines 4—4 of FIGURE 2.

FIGURE 5 is an enlarged fragmental section taken along the lines 5—5 of FIGURE 2.

FIGURE 6 is an isometric illustrating one of the pusher elements for feeding the fruit through the aligning structure.

FIGURE 7 is an enlarged section taken along line 7—7 of FIG. 1.

FIGURES 8, 9, and 10 are partially diagrammatic vertical sections showing the fruit orienting apparatus of the present invention in three sequential stages of its operation.

While the present invention will be described as embodied in apparatus which has been specifically designed to orient pears, it is to be understood that the invention is by no means to be limited to the orientation of any particular variety of fruit but could be utilized with greater or lesser success with a great many types of fruit. Particularly, the apparatus will align fruit which possess an uneven distribution of weight about a plane through their largest transverse diameter. This condition obviously exists with respect to pears which have the common feature of uneven weight distribution along their longitudinal or stem-blossom axis to define the recognizable "pear shape." Other fruit shapes which fall within the class of shapes adaptable to apparatus embodying the present invention include the "bell shape" of apples and the "bulb shapes" of turnips, beets and other fruits. The basic operation of the apparatus of the present invention which allows these fruits to be properly oriented is the catching of the widest part of the fruit between spaced walls and the encouraged rotation of the heavier end of the fruit into the lowermost position so that the centers of gravity of the fruit are disposed below the plane of their engagement with the walls.

Referring now more particularly to the drawings, which illustrate a particular embodiment of the present invention, a pear orienting apparatus 10 is shown in FIG. 1 and forms part of a pear processing line such as might be used in the feeding of pears P to a coring or slicing apparatus during a canning operation. The major operation of orienting each pear is performed by an aligning chute 11 which is provided with a particular, unique cross sectional configuration to direct each pear into the proper alignment as it is moved through the chute. The forward end of the chute receives pears in timed spaced relationship from a feeder mechanism 12, which is indicated in phantom lines and may be of any suitable construction, to feed one randomly arranged pear at a time into the chute. Such a mechanism, for example, may be of the type illustrated in the copending application of Donald W. Chamberlin for Article Feeding Apparatus, Ser. No. 174,118, now Patent No. 3,088,577, filed in the United States Patent Office on or about February 19, 1962. The spaced relationship of the pears fed into the chute 11 is maintained as they are moved through the chute by means of positive propelling apparatus comprising an endless chain conveyor and pusher mechanism 13. When the pears arrive at the rearward end of the chute each will have been manipulated into a properly aligned position, and each will then be in condition to be received in a reverser 14 which is shaped to form a continuation of the chute. The reverser operates in timed relationship to the feeder mechanism 12 which feeds the pears to the chute and in timed relationship to the chain and pusher mechanism 13 which maintains the spacing throughout the chute so that each pear will be deposited in proper alignment into a cup 15 forming part of an endless chain take-away conveyor 16. While the embodiment of the invention illustrated includes only a single chute forming a single processing line through which pears are required to be propelled in single file, it is to be understood that many such lines could be utilized in a parallel arrangement for the more efficient processing of large quantities of fruit.

As previously pointed out, the chute 11 basically performs the function of orienting each of the pears as they are positively moved therealong. The chute, which may be formed out of sheet metal, generally comprises an initial U-shaped receiving section 20 (FIGURE 3), a transition section 21 along which the depth of the chute is uniformly increased, a generally V-shaped section 22 (FIGURE 4), a second transition section 23 along which the depth of the chute is continuously decreased, and a second generally U-shaped section 24 (FIGURE 5) for moving a properly oriented pear into the reverser 14. The U-shaped section 20 of the chute generally comprises a pair of opposed side walls 26 (FIG. 3) having straight vertical upper portions 27 and inwardly bent lower portions 28 which are spaced apart to form a slot 29 centrally of the chute. This slot is also maintained through the transition portion 21, as the depth of the chute is gradually increased by gradually increasing the depth of the inwardly bent sections 28, while the vertical sections 27 remain unchanged in size and in constant spacial relationship. The V-shaped section 22, adjoining transition section 21, is formed of a separate sheet metal member having straight portions 31 similar to the straight portions 27 of the U-shaped section and including a pair of inwardly sloping side walls 32 which are joined at their lower portions to define a relatively deep V-shaped trough. It is in the sections 21 and 22 that each pear will be gripped only at two diametrically opposite points on its greatest transverse diameter by the sides of the chute so that the two gripped points will provide a pivot axis, whereby the heavier of the two parts of the fruit, on opposite sides of a transverse plane through the axis, will swing downwardly to a point below said axis to place the center of gravity of the pear below the gripping plane. Since the stem end of each pear is always in this heavier part, it will aways assume a downwardly directed position and this particular position of the stem end is used to advantage to attain the desired transfer position.

In the transition section 23, the straight portions 31 are continued and remain of uniform width and constant spacial relationship while the side walls 32 are gradually decreased in depth. At the rearward or terminal end of the chute, the cross section thereof assumes the U-shape of FIGURE 5, which is similar to that of section 20 (FIGURE 3) except that the chute is closed at the bottom. Vertical portions 31 of the transition section 23 are extended by vertical portions 34 and the inwardly inclined side walls 32, which have been gradually decreased in depth, take on the form of the inwardly bent U-shaped walls 35.

From the U-shaped section 24 of the chute 11 each of the pears is fed into the reverser 14 (FIG. 1). The reverser retains the cross sectional shape of the U-shaped section 24 including, the closed rounded bottom wall, the inwardly bent side walls 35 and the straight upper walls 34. In addition, the reverser is provided with a flat rear abutment wall 38 which is designed to limit further forward motion of the pears. The reverser is suitably mounted as by a bracket 39 on a shaft 40 which is intermittently pivoted in an oscillating manner to alternately bring the reverse into the open (solid line) position and the closed (phantom line) position of FIGURE 1. In the closed position the open end 41 of the reverser mates with and forms a continuation of the U-shaped section 24 of the chute. As is apparent from the drawings, the bottom portion of the reverser declines toward the rear abutment wall 38 when the reverser is in the closed position ready to receive a pear. When the reverser is tilted to the open position, the bottom portion declines toward the open end of the device to reverse the direction of travel of the pear and partially invert it.

When a properly oriented pear slides out of the reverser 14 stem end first, it is received within one of the cups 15 which has assumed a correct position beneath the reverser to catch the pear. In order to assure that the pear will be received within the cup, a flexible deflector element 42 of stiff cloth, rubber, or the like is draped from the chute 11 adjacent the reverser in a position to catch and deflect pears which may be propelled too far forwardly as the reverser is oscillated to the open position. The cups 15 are placed in abutting relationship upon the take-away conveyor 16 and each of the cups is adapted to be filled. It can be appreciated therefore that the conveyor 16 must move a one-cup-length increment during the time that the reverser makes one oscillation in order that each of the cups may be filled. The conveyor is supported upon idler sprockets 44 which are keyed to a supporting shaft 45 to rotate therewith; the drive means for the conveyor (not shown) is located at the forward or pulling end thereof.

Each of the pears which is propelled into the chute 11 by the feeder mechanism 12 is carried through the chute and is maintained in its spaced relationship with reference to the other pears by means of the endless chain and pusher apparatus 13. This apparatus generally comprises an endless link chain 60 which consists of two endless chain sections 60A and 60B (FIG. 2) each of which is trained over a pair of sprocket members 61, 61A (FIG. 1). Located at properly spaced positions along the link chain 60 are spaced pairs of support rods 62 and 63, each rod having an axially extending cylindrical socket which receives a pin projecting laterally from a special link in the adjacent chain section. This pin and socket connection 64 pivotally mounts the rod on the chain. These rods extend laterally of the chain and are adapted to carry pushers 65 which direct the pears through the aligning chute 11.

A detail of one of the pushers 65 is shown in FIGURE 6. There are six of these pushers in all in the illustrated embodiment of the invention, and they are equi-distantly spaced around the chain 60 as is apparent from FIGURE 1. The pushers are carried upon the rods 62 and 63 which extend through a slot 66 within the upper part of the pusher. The rod 62 is received at the forward end of the slot within a cylindrical housing 67 to which it is securely fastened by a set screw 68, while the rod 63 is received at the rear of the slot between flattened portions 69 and 70. The pusher is supported upon the rods 62 and 63 so that it is centrally positioned within the chute 11. Furthermore, the conveyor 60 is aligned so that the pusher elements will ride along the longitudinal axis of the chute.

Extending downwardly from the flattened portion 70 of the pusher is a web 71 forming the rear section of the pusher. A pair of wing-like flanges 72A and 72B are formed on the leading edge of the web 71 to define a pear engaging cavity 72. This pear engaging cavity is generally V-shaped in transverse cross-section. It is relatively wide and deep at the upper part of the pusher and is gradually narrowed and made more shallow toward its lower end, as the side flanges decrease in size. At its lower end, the pusher is provided with a relatively narrow and shallow concave portion 73 which is of uniform dimension and rounded at its lower end. At the top of each wing-shaped flange 72A and 72B is a bearing 75. These bearings are each adapted to receive a thin flexible wire 76 which is set-screwed thereto and which projects forwardly of the pear engaging cavity for a purpose presently to be explained. A single U-shaped wire could be substituted for the wires 76 if desired. This U-shaped wire would be inserted in slot 66 with the bight section received behind rod 62 and with the legs thereof extending forwardly through the bearings 75. The bight section could be held against the rod by means of set screws inserted through the lower portion of the housing 67.

As is apparent from FIGURE 1 and the operational views of FIGURES 8, 9, and 10, the pears are adapted to be engaged by the wing-shaped cavities 72 of the pushers 65 and moved through the chute. If a pear is placed in the chute in a position wherein one of its ends is tilted toward one side of the chute (such as is shown in the dashed line position of FIGURE 3), it will be first engaged at such end by one of the wires 76 as the pusher carrying the wire is rotated into position adjacent the feeder mechanism 12. The wire then serves to brush the tilted end of the pear into the center of the chute as the pusher continues to rotate so that the pear is aligned longitudinally therewith. The projecting flanges 72A and 72B provide the pusher with a general V-shaped cross-section, as clearly illustrated in FIG. 7, and therefore serve an important purpose in camming either the nose end or the stem end of the pears towards the center of the chute so that the longitudinal axes of the pears will be generally aligned with the longitudinal axis of the chute. In addition, it is to be noted that the cavity 72 is generally inclined forwardly with respect to the travel of the pusher through the chute. This inclination further assists in the proper orientation of the pears by furthering the rotation of the stem ends to the downwardly received position, particularly for those pears which are received in the chute with their stem ends upstanding. Once a pear has been properly oriented in the V-shaped section 22, the pusher element 65 serves to propel it into the reverser 14. At that time, the pear will probably be in engagement with the lower curved section 73 of the pusher as is shown in any of FIGURES 1, 8, 9, or 10. The shallow concave face of this section engages the surface of the pear and tends to keep it centrally located in the chute as it is expelled therefrom.

The pusher conveyor structure 13 is supported above the chute 11 by means of two pairs of aligned bearing members 80, 81 (one pair only shown, FIG. 2) which rest on suitable supporting frame members 82 and 83, respectively. These bearings rotatably journal an idler shaft 84 and a drive shaft 85 which support the sprockets 61 and 61A, respectively, sprockets 61A being keyed to the drive shaft 85. A pair of lower support frame members 86 and 87 are extended in parallel relationship below the upper supporting frame members 82 and 83 and are suitably interconnected to form a supporting structure for the take-away conveyor 16 and the drive mechanisms for the pusher conveyor 13 and the reverser 14. The chute 11 is supported between the upper frame members 82, 83 by means of a horizontal support 83a at the forward end and a horizontal support 83b at the rearward end.

All of the moving mechanisms in the pear aligning apparatus 10 are driven through power supplied by the endless chain take-away conveyor 16. The driving means, which is not shown in the drawings, is located at the pulling end of the chains of the conveyor 16, and comprises, in general, a shaft which is driven by an electric motor through a gear mechanism. This power driven shaft drives sprockets that engage the chains of conveyor 16, while the sprockets 44 which are idler sprockets supporting the non-driven end of the conveyor, are received on shaft 45, as previously mentioned.

The shaft 45 is journalled in bearing members 88 and 89 located on the support frame members 86 and 87, respectively. Shaft 45 also carries a large gear 90 (FIG. 2) for rotation therewith which is engaged with a smaller gear 91 fixed to a shaft 92 that is rotatably supported on the support frame members 86 and 87 in parallel relation to the drive shaft 45. The shaft 92, which is thus driven by the gears 90 and 91 through their linkage with the conveyor shaft 45, drives shaft 85 of the pusher conveyor 13 by means of a chain and sprocket drive linkage 93. Located at one end of the shaft 92 is a flat cam element 94 having a camming groove 95 on the face thereof. The camming groove is adapted to receive a cam follower 96 which is carried by a double-armed linkage 97. One arm 97A of the linkage 97 is rotatably journalled on a stub shaft 99 projecting from the frame member 87 while the other arm 97B is pivoted to arm 97A and to a crank member 98 which is rigidly attached to the shaft 40 that serves to oscillate the reverser 14 as each pear is fed thereto. The shaft 40 is rotatably supported by bearings 100 on vertical support frame members 101 which also serves to support the frame member 83b that carries the rearward end of the chute.

It is thus apparent that for each revolution of the cam member 94, the reverser 14 will be pivoted both downwardly and upwardly to its open and closed positions by means of the cam follower 96 which rides in the cam groove 95 and transmits its movement to the connecting linkage 97. The gear ratio between the gears 90 and 91, therefore, is such that the conveyor 16 will be moved an increment corresponding to the distance between the centers of the cups 15 while the gear 91 (and hence the drive shaft 92) is rotated one full revolution to drive the reverser through a complete cycle and thereby feed one pear to the take-away conveyor 16. Although the connection of the chain drive 93 with the pusher conveyor 13 is not shown, it should be apparent that this connection includes a sprocket that is keyed to shaft 85 and is provided with a suitable number of teeth, in relation to the number of teeth on the sprocket on shaft 92, such that the chain 60 will move a linear distance corresponding to the distance between any two adjacent pushers 65 while the reverser goes through one complete feeding cycle so that a newly aligned pear will be moved to the reverser for each cycle of operation.

The apparatus of the present invention is particularly adapted for the handling of pears which have had their peels removed. While the invention should not be limited to use with such fruit, this condition is of particular advantage since the pears must be able to freely rotate and slide through the various configurations of the chute 11. Obviously a pear which has had its skin removed presents a moist and slippery surface, and it may readily be propelled through the chute which may be formed out of a readily available material such as sheet metal. Since the important factor in this regard is the relative coefficient of friction between the surface of the fruit and sides of the chute, it would be possible to successfully utilize the apparatus of the present invention by decreasing the friction imposing qualities of the surface of the chute if fruit of other types, both peeled and unpeeled, were passed therethrough.

Since freshly peeled pears exude various juices and acids, the chute 11 may tend to become quite sticky after a given period of operation time. In order to remove this condition and to keep the chute relatively clean, wet, and friction free, a spray system 105 is mounted upon the support frame member 83 (FIG. 1) so as to overlie the chute. This spray system includes a pipe line 106, which is connected to a suitable water supply, and a plurality of nozzles 107 which are adapted to provide a continuous fine spray throughout the operation of the pear orienting apparatus 10.

The structure of the present invention has been illustrated and described as including a pusher conveyor 13 which serves to propel each of the pears along the chute. Such a mechanism is believed to be ideally suited for the diverse forms and shapes of pears both in achieving the proper orientation of the pears and in spacing the pears in a fixed relationship so that they may be fed to the cups on the continuously moving conveyor. It is to be understood, however, that other forms of propelling mechanisms could be used, and, in addition, a gravity feed system could be utilized by including the chute 11 toward the reverser 14.

The operation of the pear orienting apparatus 10 will be described in relation to FIGURES 8, 9 and 10 which illustrate the apparatus during three stages of one feeding cycle. In order to better make clear the sequential operations performed on the pears, certain of the pears illustrated in the above-mentioned FIGURES 8, 9, and 10 have been given the numbers P1, P2, P3, P4 and P5 which specify corresponding pears in each of the figures. In addition, corresponding pusher elements 65 have been numbered A1, A2, A3, A4 and A5 in each of the FIGURES 8, 9 and 10.

FIGURE 8 illustrates that stage of operation where a pear P1 has been received in the reverser 14 and is about to be inverted and deposited into a cup 15 on the take-away conveyor 16. The following pear P2 is riding in the V-shaped section 22 of the chute 11. As previously mentioned, it is in this section of the chute that the pears will all be similarly aligned with their stem ends down if such a condition has not already been brought about in the transition section 21 of the chute. Since the chute is quite deep here and relatively narrow, the widest portion of the pear is wedged between the sides 32 of the chute and the longer and heavier end of the pear is caused by gravitational forces to rotate downwardly so that the pear will assume a position stem end down within the chute (see FIG. 4). The following pear P3 is being pushed through the U-shaped section 20 of the chute by the pusher A3. During this stage the pear P3 could be in either a stem end first or a blossom end first position. The following pear P4 has just been received in the chute and is lying with its stem end uppermost and resting against the side of the chute, somewhat similar to the dashed line position shown in FIGURE 3. As is clear from FIGURE 8, one of the projecting wires 76 is adapted to strike the transversely projecting stem end of the pear, partially rotate, and overturn the pear so that it will be approximately aligned with the longitudinal axis of the chute.

In FIGURE 9 the pear P1 has been ejected from the reverser 14 during its pivotal motion and received within a cup 15 on the take-away conveyor. The following pear P2 is propelled by the pusher element A2 up the sloping bottom portion of the transistion section 23 of the chute. Depending upon its particular length and thickness, each pear will engage the bottom portion of the chute section 23 at some position therealong and be pivoted into alignment therewith with its blossom end foremost (see FIG. 5). It is also apparent from FIG. 9 that the pusher elements A3 and A4 have engaged the respective pears P3 and P4 with the pear engaging cavity 72 thereof to propel them along the chute and to assist in aligning the pears along the longitudinal axis of the chute.

In FIGURE 10 the pusher A2 is riding up and away from the chute by means of the driving chain 60 and is serving to propel the pear P2 into the reverser 14. The following pear P3 is gradually being oriented into the proper stem end down position as the chute 11 is lengthened in the transition section 21. The following pear P4 is propelled along by the pusher element A4 with its longitudinal axis aligned with the axis of the chute, and an additional pear P5 has just been received in the forward end of the chute. As is clearly illustrated, a fifth pusher element A5 is now in position to receive and operate on the pear P5 and propel it through the chute and into the proper cup 15 on the take-away conveyor in the manner above described.

Although the reverser 14 provides a positive means of placing each pear into a series of uniformly spaced cups as shown, it could be eliminated if another form of feeding device were desired, and the pears, each of which has already been aligned by the chute, could be deposited by other means in other forms of conveying or feeding devices.

From the foregoing description, it is apparent that the structure of the present invention provides an improved fruit orienting and feeding apparatus which will operate to feed properly aligned fruit in timed and spaced relationship to a conveying system for further processing operations. The structure of the invention is simple in nature and can be economically produced.

While one embodiment of the present invention has been shown and described, it will be understood that various changes and modifications may be made therein without departing from the spirit of the invention or the scope of the appended claims.

The invention having thus been described what is believed to be new and desired to be protected by Letters Patent is:

1. An apparatus for orienting produce which are unsymmetrical about a transverse plane through their largest transverse diameters comprising a chute having a generally V-shaped cross section defined by side walls which are separated a first distance substantially equal to the largest transverse diameters of the produce at first points spaced from the vertex of the V and separated a second distance less than the first distance at second points closer to the vertex of the V but farther from said first points than the over-all lengths of the produce so that the side walls contact and suspend the produce at said first points causing the suspended produce to rotate about their largest transverse diameters into properly oriented positions, and means for moving the produce through the chute.

2. An apparatus for orienting fruit which are unsymmetrical about a transverse plane through their largest transverse diameter comprising a chute having side surfaces defining a first portion of generally U-shaped cross section and a second portion of generally V-shaped cross section, said side surfaces in said second portion being adapted to engage the fruit at opposite ends of their largest transverse diameters to suspend the fruit, means between said side surfaces for engaging a fruit and substantially aligning the longitudinal axis of the fruit with the longitudinal axis of the chute in said first portion thereof, and means for moving the fruit through said second portion of the chute to cause the fruit to engage the side surfaces thereof and rotate about said diameter to a properly oriented position.

3. An apparatus for orienting fruit which are unsymmetrical about a transverse plane through their largest transverse diameter comprising a fixed chute having a first portion of generally U-shaped cross section, a second portion of generally V-shaped cross section, and a third portion; means for substantially aligning the longitudinal axis of the fruit with the longitudinal axis of the chute in said first portion thereof; means for moving the fruit through said second portion of the chute to cause the fruit to engage the side walls of the chute at spaced points and rotate about said points of engagement to a properly oriented position with their centers of gravity disposed below said plane; and means in said third portion for discharging the fruit in spaced and timed relationship.

4. An apparatus for orienting fruit which are unsymmetrical about a transverse plane through their largest transverse diameter comprising a fixed chute having a first portion of generally U-shaped cross section, a second portion of generally V-shaped cross section, and a third portion which is movably mounted with respect to said first and second portions; means for substantially aligning the longitudinal axis of the fruit with the longitudinal axis of the chute in said first portion thereof; means for moving the fruit through said second portion of the chute to cause said fruit to contact the side walls of said chute at diametrically opposed points and rotate about an axis defined by said points of contact to a position with their centers of gravity disposed below said plane; and means for moving said third portion to discharge the fruit in timed and spaced relationship.

5. An apparatus for orienting fruit which are unsymmetrical about a transverse plane through their largest transverse diameter comprising a fixed chute having a generally V-shaped cross section, defined by side walls that have downwardly converging portions extending for a predetermined distance along said chute and a pusher element for moving said fruit longitudinally along said chute to cause the fruit to engage the side walls of the chute and rotate about said diameter to a properly oriented position with their centers of gravity disposed below said plane.

6. An apparatus for orienting fruit which are unsymmetrical about a transverse plane through their largest transverse diameter comprising a fixed chute having a generally V-shaped cross section, defined by side walls that have downwardly converging portions extending for a predetermined distance along said chute and a conveyor means having a plurality of spaced pusher elements thereon, said elements being sequentially received within said chute to propel the fruit therethrough in spaced relationship, the sides of said chute engaging the fruit and causing the fruit to rotate about an axis defined by said points of engagement to a properly oriented position with their centers of gravity disposed below said plane.

7. An apparatus for orienting fruit which are unsymmetrical about a transverse plane through their largest transverse diameter comprising a chute having first and second portions, means for feeding randomly arranged fruit in timed and spaced relationship to said first portion, means operable within said first portion to align the fruit with their longitudinal axes substantially parallel with the longitudinal axis of the chute, conveyor means having spaced pusher elements thereon for moving the fruit through said chute and retaining the fruit in said spaced and timed relationship, said second portion of the chute being of generally V-shaped cross section to define inwardly extending side walls which engage the fruit at spaced points in said plane and cause the fruit to rotate about said diameter to a properly oriented position with their centers of gravity disposed below said plane.

8. An apparatus for orienting fruit which are unsymmetrical about a transverse plane through their largest transverse diameter comprising a chute having first and second portions, means for feeding randomly arranged fruit in timed and spaced relationship to said first portion, means operable within said first portion to align the fruit with their longitudinal axes substantially parallel with the longitudinal axis of the chute, conveyor means having spaced pusher elements thereon for moving said fruit through said chute and retaining the fruit in said spaced and timed relationship, said second portion of the chute being of generally V-shaped cross section to cause the fruit to engage the sides of the chute at spaced points in said plane and rotate about said diameter to a properly oriented position with their centers of gravity disposed below said plane, and means at the terminal end of said chute for discharging the fruit in said timed and spaced relationship, said means including a channel having an open end adapted to mate with the terminal end of the chute in a first position to receive fruit therefrom, and means pivotally mounting said channel for pivotal movement to a second position wherein said fruit is discharged out of said open end.

9. An apparatus for orienting fruit which are unsymmetrical about a transverse plane through their largest transverse diameter comprising a chute having a first generally U-shaped portion, a second generally V-shaped portion, and a third movably mounted portion; means for feeding randomly arranged fruit in timed and spaced relationship to said first portion; a series of spaced pusher elements operable to move the fruit through said chute and maintain the fruit in said timed and spaced relationship, said elements including means engageable with the fruit in said first portion to substantially align the longitudinal axes of the fruit with the longitudinal axis of the chute; the fruit being gripped within the V-shaped cross section of said second portion of the chute to cause the fruit to rotate into a position wherein its center of gravity is received below said plane; and means operable to oscillate said third portion between receiving and discharging positions in timed relationship to said feeding means to continuously feed properly oriented fruit in said timed and spaced relationship.

10. In an apparatus for positioning fruit with their stem ends down in a substantially horizontal conveyor which is moved in a predetermined forward direction past a station for receiving pears: an output channel having a bottom wall and opposite open and closed ends; means mounting the channel for pivotal movement about an axis extending transversely of said conveyor above and forward of said receiving station between a fruit receiving position with said bottom wall declined toward said closed end and a fruit discharging position with said bottom wall declined toward said open end and said receiving station; an input chute adapted to guide fruit therealong with their stem-blossom axes disposed longitudinally of said chute; and means for transferring said fruit from said input chute to said output channel when the latter is in its receiving position so that all of the fruit in said output channel have their stem ends facing the open end of said output channel whereby the fruit in said output channel slide out of the same into said conveyor with their stem ends down.

11. An apparatus for orienting fruit which are unsymmetrical about a transverse plane through their largest transverse diameter comprising a fixed chute having first and second portions, and a pusher element having a surface for engaging and moving the fruit along the longitudinal axis of the chute, said pusher element having a projection extending forwardly of its fruit engaging surface at either side thereof for contact with an end of a fruit which is lying against one of the sides of said first portion of the chute to substantially align the longitudinal axis of the fruit with the longitudinal axis of the chute, said second portion of the chute having generally V-shaped side walls which engage the fruit at spaced points thereon in said plane and cause the fruit to rotate about said diameter as defined by said engagement points to a properly oriented position with its heaviest end disposed below said plane.

12. In an apparatus for orienting fruit which are unsymmetrical about a transverse plane through their largest transverse diameter, the combination comprising a chute having a bottom and spaced side walls with first and second longitudinal portions, a series of spaced pusher elements each having a fruit engaging surface thereon, means mounting said elements for movement along the longitudinal axis of the chute to move the fruit therethrough and including means alternately pivoting each of said elements into said first portion of the chute to engage a fruit lying therein with its fruit engaging surface, and a pair of projecting members extending forwardly from said surface at either side thereof and rotating with the pusher element as it is pivoted to engage an end of a fruit which is lying against one of said side walls to overturn said fruit and substantially align it with the longitudinal axis of the chute, said side walls in said second longitudinal portion generally defining a V-shape to grip said fruit at spaced points in said plane and cause said fruit to rotate about said diameter defined by said spaced points to properly oriented positions with their centers of gravity disposed between said plane and the bottom of the chute.

13. In an apparatus for orienting fruit which are unsymmetrical about a transverse plane through their largest transverse diameter, the combination comprising a chute with at least a portion thereof having inwardly sloping sides defining a V-shape and a bottom section, and a pusher element for moving the fruit through said chute and causing the fruit to be received between said sides in said plane in properly oriented positions with their centers of gravity disposed below said diameter, said pusher element including a fruit engaging surface of generally concave shape, said surface being relatively wide at the top of the element and narrowing gradually toward the lower end of the element, said element having a flattened tip at its lower end which is rearwardly rounded for engagement with the upper surface of a fruit riding upon said bottom section to propel the fruit from the chute.

14. In an apparatus for orienting fruit including a chute along which the fruit are propelled, the improvement comprising an endless chain conveyor, said conveyor including a series of pairs of rods attached to and spaced along the conveyor chain, means for pivotally mounting at least one of each of said pairs of rods on said chain, and a series of pusher elements for pushing the fruit through the chute, each of said elements having a slot therethrough in its upper portion for receiving one of said pairs of rods with one rod being received at each end of said slot, said one of each of said pair of rods being rigidly attached to said element to rotate therewith whereby said conveyor successively carries said elements into and out of said chute to continuously propel fruit therethrough in spaced relationship.

15. An apparatus for orienting fruit comprising a chute having a cross sectional configuration to cause fruit fed therethrough to assume a properly oriented position within the chute, a channel having a rear wall at one end with an open forward end mating with and forming a continuation of one end of said chute, means for pivotally mounting said channel about an axis disposed near the lower end of said rear wall, a first conveyor positioned longitudinally of said chute and having a plurality of equally spaced pusher elements extending outwardly therefrom, said elements being located so as to ride within said chute to move the fruit therethrough and feed the fruit to said channel, means for feeding fruit to the other end of the chute in timed and spaced relationship, means for driving said first conveyor so that each element will move one fruit through the chute to maintain said timed and spaced relationship, means for pivoting said channel between a first position wherein said channel forms a continuation of said chute to receive a fruit and a second position wherein said forward end of the channel is spaced from and disposed below the chute to discharge the fruit, said pivoting means being operated so that said channel will move through a complete cycle between said first and second positions in the time necessary for said elements to move to feed one fruit to said channel, a second conveyor spaced from and disposed below said channel and having a plurality of longitudinally spaced pockets thereon each being adapted to receive a fruit which is discharged from said channel, and means for moving said second conveyor a linear distance equal to the distance between the centers of two adjacent pockets during the time necessary for one cycle of said channel.

16. An apparatus for orienting fruit which are unsymmetrical about a transverse plane through their largest transverse diameter comprising a chute having side walls and a bottom portion, said chute also having first and second longitudinal sections, said walls in said first longitudinal section being generally V-shaped to grip the fruit at spaced points in said plane to cause the fruit to rotate to positions with their centers of gravity disposed below said plane, said bottom portion of the second longitudinal section being upwardly inclined, a discharge mechanism at the end of the chute adjacent said second longitudinal section and having side walls and a bottom portion adapted to mate with said end of the chute, means for mounting said discharge mechanism for pivotal movement between a first position wherein said mechanism forms a continuation of said chute and a second position wherein the mating portion of said mechanism is spaced from and disposed below said end of the chute, and means for moving a fruit through the chute whereby the bottom end of said fruit engages said upwardly inclined bottom portion of said second section of the chute to cause the fruit to turn and ride along the upwardly inclined bottom portion and be ejected therefrom into said discharge mechanism in its said first position, said discharge mechanism reversing the direction of travel of said fruit and expelling it in said second position of the mechanism with the said bottom end of the fruit being expelled first and being disposed in downward inclination by the mechanism.

17. An apparatus for orienting fruit comprising a chute having first and second longitudinal sections, said first section having a cross sectional configuration to cause fruit passed therethrough to assume a properly oriented position therewithin, means for moving the fruit through the chute from the first to the second section, said second section having a bottom portion which is inclined toward the direction of motion of the fruit through the chute whereby the lowermost ends of said fruit will contact said bottom portion to cause the fruit to pivot into supporting engagement therewith, and a discharge mechanism adjacent the end of said second section, said moving means being operable to expel the fruit into said mechanism, said mechanism being operable to reverse the direction of motion of the fruit and discharge the fruit into a cup spaced below said chute with the said ends of the fruit disposed downwardly therein.

18. A fruit orienting apparatus for orienting fruit which are unsymmetrical about a transverse plane through their largest transverse diameter comprising a chute having a section which is generally V-shaped in cross-section to cause said fruit to be gripped at spaced points on their said largest diameters and rotated into a position with their centers of gravity disposed below said diameters, and a pusher element for positively moving the fruit along the chute and having a concave fruit engaging face for aligning the longitudinal axes of the fruit with the longitudinal axis of the chute, said element being generally V-shaped in transverse dimension so as to substantially fill all of that part of the chute in which fruit are adapted to be gripped by the chute and moved by said element.

(References on following page)

References Cited by the Examiner

UNITED STATES PATENTS

| | | | |
|---|---|---|---|
| 123,391 | 2/1872 | Giffhorn | 198—174 |
| 405,608 | 6/1889 | Selleck | 198—172 |
| 517,511 | 4/1894 | Anderson | 198—174 X |
| 751,885 | 2/1904 | Webster | 198—174 |
| 1,326,785 | 12/1919 | Riley | 198—172 |
| 1,435,263 | 11/1922 | Soubier | 198—27 |
| 1,657,680 | 1/1928 | Lorenz | 198—27 X |
| 2,379,911 | 7/1945 | Kottmann | 198—27 X |
| 2,734,616 | 2/1956 | Schell | 198—27 |
| 2,787,362 | 4/1957 | Hill. | |
| 2,911,082 | 11/1959 | Wenzel. | |
| 3,040,869 | 6/1962 | Mumma. | |
| 3,101,831 | 8/1963 | Gaddini. | |

SAMUEL F. COLEMAN, *Primary Examiner.*

EDWARD A. SROKA, *Examiner.*